A. STUBER.
LIQUID MEASURING APPARATUS.
APPLICATION FILED APR. 13, 1918.
1,361,641.
Patented Dec. 7, 1920.
3 SHEETS—SHEET 1.
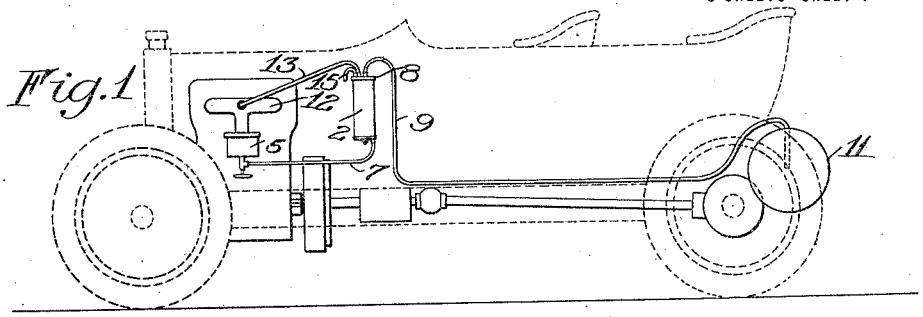

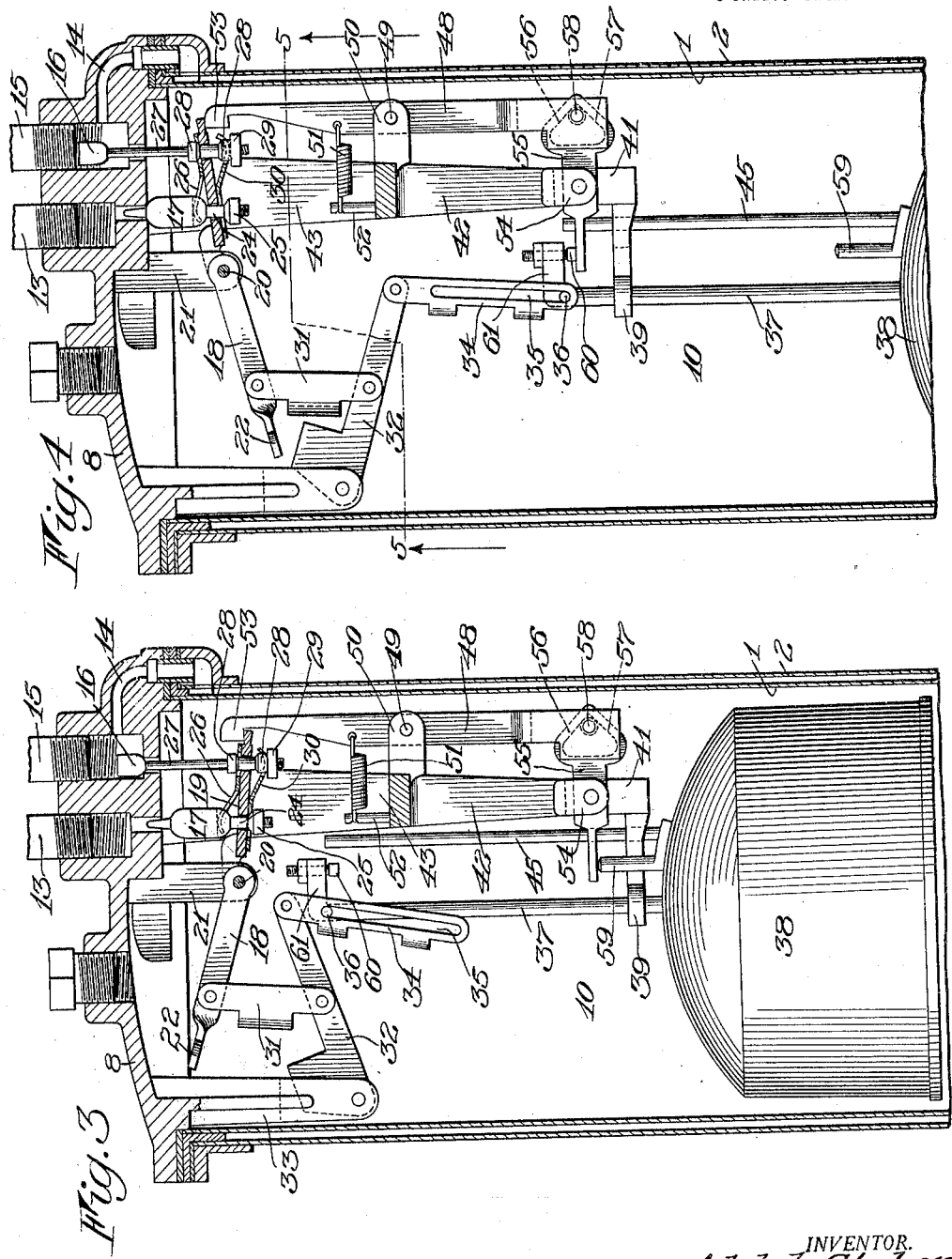

A. STUBER.
LIQUID MEASURING APPARATUS.
APPLICATION FILED APR. 13, 1918.

1,361,641.

Patented Dec. 7, 1920.
3 SHEETS—SHEET 3.

WITNESSES:
Francis Jurdone Jr
Alvin K. Goodwin,

INVENTOR.
Adolph Stuber
BY Church + Rich
his ATTORNEYS.

UNITED STATES PATENT OFFICE.

ADOLPH STUBER, OF ROCHESTER, NEW YORK.

LIQUID-MEASURING APPARATUS.

1,361,641.      Specification of Letters Patent.    Patented Dec. 7, 1920.

Application filed April 13, 1918. Serial No. 228,328.

*To all whom it may concern:*

Be it known that I, ADOLPH STUBER, a citizen of the United States, residing at Rochester, in the county of Monroe and State of New York, have invented certain new and useful Improvements in Liquid-Measuring Apparatus; and I do hereby declare the following to be a full, clear, and exact description of the same, reference being had to the accompanying drawings, forming a part of this specification, and to the reference-numerals marked thereon.

My invention relates to a liquid measuring device and has for its object to provide means interposed in a liquid feeding system for measuring predetermined quantities of liquid in transit from one point to another, such as from the liquid fuel supply tank of an automobile to the engine thereof.

A further object of the invention is to provide a suction controlled liquid measuring apparatus adapted to accurately measure predetermined quantities of liquid and one which will operate uniformly under all conditions of service.

To these and other ends the invention consists in certain improvements and combinations of parts, all as will be hereinafter more fully described, the novel features being pointed out in the claims at the end of the specification.

In the drawings:

Figure 1 is a view in elevation showing the application of the invention to a motor driven vehicle;

Fig. 2 is a sectional elevation through the measuring tank with the float shown in its lowermost position;

Fig. 3 is an enlarged vertical section showing the float in substantially its uppermost position;

Fig. 4 is a similar sectional view with the float shown in substantially its lowermost position;

Similar reference numerals in the several figures indicate the same parts.

Heretofore in the construction of float controlled liquid measuring tanks for motor driven vehicles, so far as I am aware, no means has been provided for locking the valves arranged to alternately open and close the suction and air inlet openings communicating with the liquid measuring chamber. The result in cases of this kind has been that the accurate measurement of predetermined quantities of liquid has been greatly interfered with under certain adverse conditions of operation, the valves being opened or closed prematurely in cases when the float is unduly influenced by sudden jolts imparted to the vehicle at such times when the measuring chamber is substantially filled or emptied and the float is approaching the position at which it normally effects operation of the valves.

It is the purpose of the present invention to provide means for overcoming the above mentioned objections to an apparatus of this kind and to insure the proper functioning of the valves controlling the liquid supply to and from the measuring chamber under all conditions of service.

Figure 6:
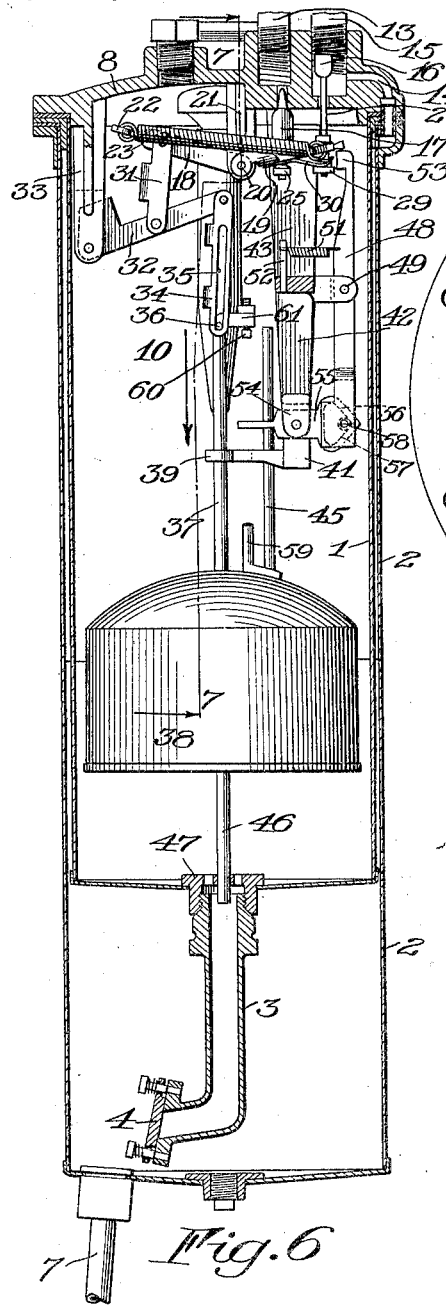
Fig. 6 is a sectional elevation showing the float in position to effect operation of the links controlling the valve operating mechanism.

In carrying out the preferred embodiment of my present invention, I have provided the inner and outer tanks or receptacles 1 and 2 respectively, the former having a tubular member 3 projecting into the latter and provided with a self-closing outlet valve 4, as shown in Fig. 6. The lower end of the tank 2 is connected preferably with the carbureter 5 of the engine 6 by means of the discharge pipe 7 while the head 8 of the tank 1 is adapted to receive the fuel inlet pipe 9 connecting the measuring chamber 10 with the liquid supply receptacle 11 at the rear of the vehicle, as shown in Fig. 1. The measuring chamber 10 is also connected with the manifold 12 of the engine through the head 8 of the tank by means of the pipe 13. The tank 2 is at all times in communication with the atmosphere through the port 14 and short pipe 15 extending into the head 8, as shown in Fig. 6. The air inlet pipe 15 also communicates with the vacuum measuring chamber 10 at such times as the valve 16 is open and the valve 17 closed, which takes place after a predetermined amount of fuel has been transferred to the measuring chamber through the pipe 9 by means of the suction produced in said chamber when the valve 17 is open and the valve 16 closed.

Figure 5:
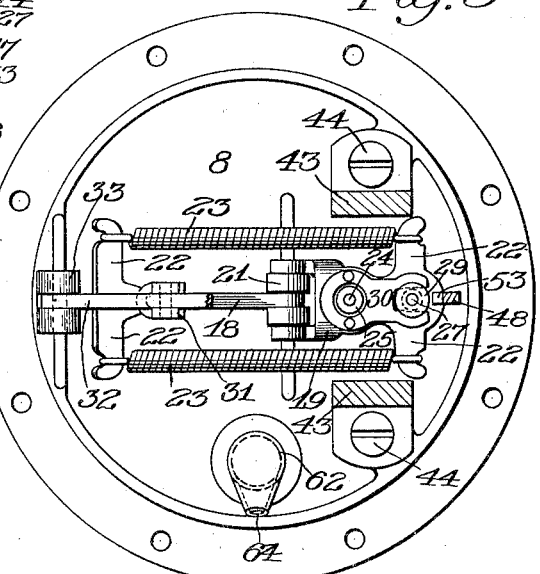
Fig. 5 is a sectional inverted plan taken on line 5—5 of Fig. 4.
Figure 7:
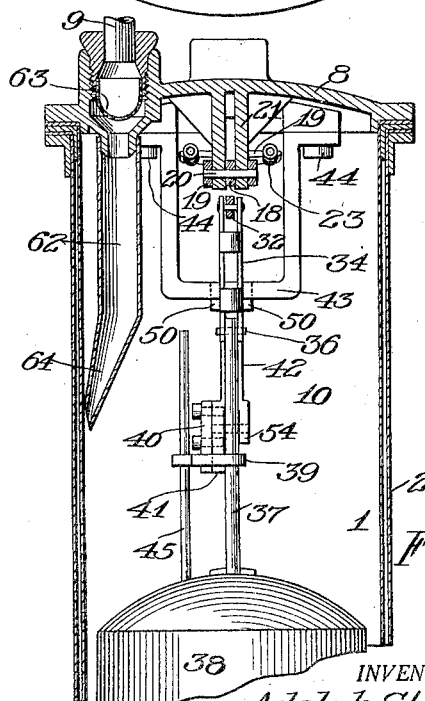
Fig. 7 is a sectional view taken on line 7—7 of Fig. 6.

The mechanism for effecting the alternate opening and closing of said valves comprises the arms 18 and 19 pivoted at 20 on the bracket 21 depending from the head 8, the outer extremities of said arms being provided with the lateral projections 22 adapted to be connected by the tension springs 23, as shown in Fig. 5. The arm 19 is provided with a centrally disposed aperture through which loosely extends the stem 24 of the valve 17, said stem being provided with an adjusting nut 25 for limiting the upward movement of the valve relatively to said arm. A spring 26 is positioned upon the top of the arm and its inner end extended into a recess in the bottom of the valve 17 to hold the latter in closed position when the measuring chamber is being emptied. The stem 27 of the valve 16 is also loosely extended through the arm 19 near the outer end thereof, and is limited in its vertical movement upon said arm by means of the spaced stops 28 which are suitably connected with the stem on the opposite sides of the arm. The lower end of the stem 27 is provided with a nut 29 arranged to receive the free end of a spring 30 secured upon the bottom of the arm 19, as shown in Figs. 4 and 5, and provided for the purpose of holding the valve 16 in contact with its seat when the valve 17 is in open position, as shown in Fig. 3. The operation of the arm 19 to insure the alternate opening and closing of the valves 16 and 17 is, of course, effected by the springs 23 when they are moved above and below the pivot point 20 by the up-and-down movement of the arm 18 which is operated by the link 31. The lower end of the link 31 is pivotally connected with a lever 32, the outer end of which is pivoted upon the depending bracket 33 carried by the head 8 of the measuring receptacle, as shown in Fig. 3. The inner end of the lever 32 is pivotally connected with a link 34 which is slotted at 35 for the greater portion of its length to receive the pin projection 36 at the upper end of the float rod 37 carried by the float 38 which is free to move up and down in the liquid measuring chamber a distance equal to the length of the slot 35 without effecting movement of the lever 32. The float rod 37 is guided by a plate 39 having a vertically disposed portion 40 secured to the jaw 41 of the bracket 42 at the upper end of which is provided the yoke 43 arranged to straddle the valve operating arm 19, as shown in Fig. 7, said yoke being preferably secured to the head 8 by means of the screws 44. A supplemental guide rod 45 is mounted on the top of the float 38 and is guided by the plate 39, while from the bottom of the float is extended a guide rod 46 arranged to be guided by the plug 47 to which the tubular discharge member 3 is connected at the bottom of the measuring tank, as shown in Fig. 6. The mechanism for locking the valve controlling arm 19 comprises the latch or locking lever 48 pivoted intermediate its ends at 49 between the laterally projecting lugs 50 carried by the yoke 43. The locking lever is held in its normal locking position with respect to the arm 19 by means of the spring 51, the inner end of which is connected with a stud 52 on the horizontal portion of the yoke 43 while the opposite end of the spring is connected with said lever at a point slightly above its pivot, as shown in Figs. 3 and 4. The top end of the locking lever is provided with a catch 53, the upper surface of which is adapted to engage the under side of the outer extremity of the valve controlling arm 19 to lock the same, as shown in Fig. 4, while the lower surface of the catch is arranged to engage the upper side of the arm, as shown in Fig. 3. In this figure, the catch on the locking lever holds the arm 19 in position to cause the spring 30 to retain the air inlet valve 16 in contact with its seat, while in Fig. 4 said catch maintains the arm in position to effect the seating of the valve 17 whereby communication between the vacuum measuring chamber and suction producing apparatus is closed. Pivotally mounted between the jaws 41 and 54 of the bracket 42 is an operating lever 55 for the locking lever 48 having reversely inclined surfaces 56 and 57 arranged to travel upon a pin 58 extending between the forked ends of said locking lever whereby the latter is actuated to release the arm 19, as shown in Fig. 2. Movement of the operating lever 55 in one direction is effected by the engagement of the upstanding pin 59 on the float 38 with the inner end of said lever when said float reaches its uppermost or substantially its uppermost position, as shown in Fig. 3. Movement of the operating lever in an opposite direction is effected by the adjustable screw or bolt 60 on the head 61 of the float rod 37 when said float reaches substantially its lowermost position, as shown in Fig. 4. In either case, the catch 53 of the locking lever is moved outwardly to disengage the arm 19 to permit movement of the latter by the springs 23, either to the position shown in Fig. 3 or to that shown in Fig. 6. It will be noticed that in Fig. 6 the outer end of the arm 19 is held a little above the top of the catch by the springs 23. This is to provide sufficient clearance for said catch when the latter is returned to normal position by the spring 51. However, in Fig. 4, the arm is shown resting on the catch, but this is after the arm 18 has been moved down by the float to bring the springs 23 below the pivotal point 20 of said arms, and if the catch were not in locked position at this time, the valve 17 would be prematurely opened by a sudden plunging of the float downwardly. In the present instance, however, neither the valves 16 or 17 can accidentally be released. They can only be released at the time the float reaches certain predetermined points in its up-and-down movement, as when the lever 55 is operated in one direction by the pin 59 and in an opposite direction by the bolt 60. By this means, the operation of the valves 16 and 17 is always effected at the proper time, thereby affording a uniform and accurate measurement of equal quantities of liquid regardless of the undue influences tending to accentuate the movement of the float.

Referring to Fig. 4, when the locking lever 48 is moved from under the outer extremity of the arm 19, the latter is free to travel upon the valve stem between the stops 28 a distance sufficient to allow the springs 23 to carry the latch engaging portion of the arm to a point slightly below the bottom surface of the latch whereby the proper clearance is provided for the return of the latch to normal position by the spring 51. However, if the arm itself were adapted to engage the lower stop 28 to hold the valve 16 upon its seat and said arm stood even a slight distance beneath the lower surface of the latch 53, when the float moved up to the position shown in Fig. 3 the springs 23 would pull the arm 19 into engagement with the latch and there would be nothing left to hold the valve 16 upon its seat. To overcome this objection, the spring 30 has been provided which is always in yielding contact with the nut 29 to hold the valve in contact with its seat. Likewise the spring 26 is provided for holding the valve 17 in contact with its seat under similar conditions, as shown in Fig. 4. By providing the slotted link 34 in which the pin 36 on the float rod 37 travels, a measuring tank of greater depth is afforded which may consequently be made relatively small in diameter, thereby minimizing the tendency of the liquid to become unduly disturbed when the vehicle is in motion and decreasing the liabilities to inaccuracies in the measurement of the liquid from time to time.

In order that the liquid forced into the measuring chamber may not be discharged directly upon the float, I have provided the extension tube 62 beneath the conduit 9 and strainer 63, as shown in Fig. 7. The tube 62 is provided with an out-turned portion 64 arranged to discharge the liquid against the wall of the receptacle in a manner which will not interfere with the proper operation of said float.

In the operation of my improved measuring device, assuming that the suction producing apparatus has supplied substantially the whole of the predetermined amount of liquid to the tank to be measured thereby, the float will have been moved upwardly to cause the pin 59 to engage the inner end of the operating lever 55, as shown in Fig. 3.

Upon further upward movement of the float, the inclined surface 56 of the lever 55 will operate to pull the lower end of the locking lever 48 inwardly, thereby causing the latch 53 to be thrown out of engagement with the valve controlling arm 19 and permitting the latter to be pulled up by the springs 23 to the position shown in Fig. 6, whereby the valve 16 is raised to open the air inlet passage leading to the measuring chamber and the valve 17 seated to close the suction conduit leading to the manifold of the engine.

While the liquid is being fed to the measuring chamber, the outlet valve 4 on the tubular member 3 remains closed under the action of the springs shown thereon, but as soon as the liquid in said chamber is summitted to atmospheric pressure said valve will be opened and the liquid will flow into the tank 2 until it finds its level with that in the measuring receptacle, and from the tank 2, which is always under atmospheric pressure, the liquid is supplied to the carbureter through the conduit 7. There is, of course, always sufficient fuel in the outer receptacle 2 to properly supply the engine or other fuel consuming device that may be connected with the measuring apparatus while the latter is being filled. Upon the opening of the valve 16 the float will descend rather rapidly from the position shown in Fig. 3 to substantially that shown in Fig. 6, or in other words, until the height of the fuel becomes the same in both receptacles. After this, the descent of the float is more gradual and finally the bolt 60 engages and actuates the operating lever 55, thereby causing the inclined surface 57 to move the lower end of the locking lever 48 inwardly to release the arm 19 and permit the springs 23 to pull the latter down, whereby the valve 17 is opened and the valve 16 closed.

While in the present instance my improved vacuum measuring apparatus is supplied with liquid by means of suction produced by the engine of a motor driven vehicle, it will be understood that any other suitable suction producing device may be substituted therefor without departing from the spirit of the invention.

I claim as my invention:

1. In combination, a liquid measuring receptacle having a fluid supply conduit connected therewith, a suction conduit connected with said receptacle, an air inlet passageway leading to the receptacle, a valve controlling the suction conduit, a second valve controlling said air inlet passageway, means for periodically effecting the alternate opening and closing of the valves, and a latch controlled by the last mentioned means and coöperating therewith to lock the valves when actuated.

2. In combination, a liquid measuring receptacle having a fluid supply conduit connected therewith, a suction conduit connected with said receptacle, a valve controlling said suction conduit, means periodically effecting the operation of said valve, and a latch device controlled by said means and coöperating therewith to lock said valve when actuated.

3. In combination, a liquid measuring receptacle having a fluid inlet passageway leading thereto, a suction conduit communicating with said receptacle, a valve controlling said conduit, devices operating in one direction for periodically operating said valve to open and closed positions, means movable transversely to the path of movement of the operating device for locking the valve when actuated, and an air inlet valve upon the receptacle for supplying air thereto when the first mentioned valve is closed.

4. A liquid measuring apparatus comprising a receptacle having a supply conduit connected therewith, a suction conduit connected with the receptacle, an air inlet passageway communicating with the receptacle, valves for alternately opening and closing said suction conduit and passageway, a movable member operatively connected with said valves, a float operatively connected with said movable member, and means controlled by the float for locking said movable member when actuated.

5. A liquid measuring apparatus comprising a receptacle having a liquid supply conduit connected therewith, a suction conduit connected with the receptacle, an air inlet passageway communicating with the receptacle, valves for alternately opening and closing said suction conduit and passageway, a movable member operatively connected with said valves, a float operatively connected with said movable member, and means for locking the movable member adapted to be actuated by the float upon movement of the latter to predetermined points within said receptacle.

6. A liquid measuring apparatus comprising a receptacle having a liquid supply conduit connected therewith, a suction conduit connected with the receptacle, a valve controlling said suction conduit, a movable member operatively connected with the valve, a float operatively connected with said movable member, means operatively connected with the float for locking said movable member, and an air inlet valve for supplying air to the receptacle.

7. A liquid measuring apparatus comprising a receptacle having a liquid supply conduit connected therewith, a suction conduit connected with the receptacle, a valve controlling said suction conduit, a float operatively connected with said valve, an air inlet valve adapted to supply air to the receptacle when the first mentioned valve is closed, and means controlled by the float arranged to lock said conduit closing valve when actuated.

8. A liquid measuring apparatus comprising a receptacle having a liquid supply conduit connected therewith, a suction conduit connected with said receptacle, a valve controlling said suction conduit, a movable member operatively connected with said valve, a float operatively connected with the movable member, a pivoted member for locking said movable member, and a lever operatively connected with said pivoted member and arranged to be actuated by said float when the latter reaches a predetermined point in the receptacle.

9. A liquid measuring apparatus comprising a receptacle having a liquid supply conduit connected therewith, a suction conduit connected with said receptacle, a valve controlling said suction conduit, a movable member operatively connected with said valve, a latch for locking said movable member to prevent accidental displacement of said valve, means adapted to be operated by the float for actuating the latch, means for returning said latch to normal position when actuated, and a valve for admitting air to said receptacle when said suction valve is closed.

10. A liquid measuring apparatus comprising a receptacle having a liquid supply conduit connected therewith, a suction conduit connected with said receptacle, a valve controlling said suction conduit, an air inlet passageway communicating with said receptacle, a valve controlling said air inlet passageway, a pivoted arm operatively connected with said valves to effect the alternate opening and closing of the same, a float operatively connected with said pivoted arm for actuating the latter in opposite directions, a latch adapted to alternately engage said arm upon opposite sides thereof to prevent accidental displacement of said valves, means for moving said latch in one direction to release said pivoted arm, means for returning the latch to normal position, and means connected with the float for actuating said latch operating means when said float reaches the limit of its travel in opposite directions.

11. A liquid measuring apparatus comprising a receptacle having a liquid supply conduit connected therewith, a suction conduit connected with said receptacle, a valve controlling said suction conduit, a pivoted arm operatively connected with said valve, a link depending from the arm and movable therewith, a float, a rod rigidly upstanding therefrom adapted to travel within said link a predetermined distance without actuating the same and thereafter moving the link to actuate the valve, and an air inlet valve for supplying air to the receptacle operatively connected with said arm.

ADOLPH STUBER.